UNITED STATES PATENT OFFICE

2,286,767
COATED ALKALINE ARTICLE AND PROCESS OF MAKING SAME

Richard Stanley Shutt, Columbus, Ohio, assignor to E. I. du Pont de Nemours & Company, Wilmington, Del., a corporation of Delaware No Drawing. Application December 21, 1938, Serial No. 247,105

7 Claims. (Cl. 117—72)

This invention relates to plastic compositions and more particularly to plasticized compositions comprising a polymer of a compound of the formula

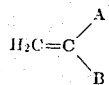

where A is hydrogen or an alkyl radical, and B is selected from the group consisting of halogen, aryl, cyano, acyl, acyloxy, alkoxy, aryloxy, carboalkoxy, and carboaryloxy radicals.

Plasticizers hitherto suggested for such polymers have serious defects. Many plasticizers, including the commonly used esters, are not alkali-resistant and are therefore not suited for incorporation with vinylidene polymers in the production of alkali-resistant coating compositions. The chlorinated hydrocarbons, while alkali-resistant, lack compatibility with the polymers used in the practice of this invention, and hence are not suitable plasticizers therefor.

This invention has as an object the preparation of new plasticized compositions. Another object is the preparation of plasticized compositions comprising polymers of at least one compound of the general formula

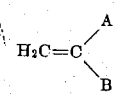

where A is hydrogen or an alkyl radical, and B is selected from the group consisting of halogen, aryl, cyano, acyl, acyloxy, alkoxy, aryloxy, carboalkoxy, and carboaryloxy radicals. A further and highly important object is the preparation of plastic compositions highly resistant to alkali. Another object is the preparation of plastic compositions especially suitable for uses in alkaline environments, e. g., in contact with alkaline fumes or liquids or over alkaline structural surfaces, such as concrete. Another object is the production of plasticized polymer compositions so resistant to alkali that they are suitable for use in coating compositions over alkaline surfaces as protective primers under orthodox oleoresinous top coats. A further object is the preparation of such compositions having substantially permanent flexibility and adherence.

The above and other objects appearing hereinafter are accomplished by incorporating a bis-aryloxyalkyl ether, with or without the aid of a solvent into a polymer of at least one compound of the formula

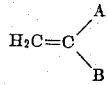

where A is hydrogen or an alkyl radical and B is selected from the group consisting of halogen, aryl, cyano, acyl, acyloxy, alkoxy, aryloxy, carboalkoxy, and carboaryloxy radicals.

The bis-aryloxyalkyl ethers used in the practice of this invention have the general formula Ar—O—R—O—R'—O—Ar', where Ar and Ar' are monovalent aryl radicals which may be different, but are preferably the same, and R and R' bivalent alkylene radicals which may be different, but are preferably the same.

The bis-aryloxyalkyl ethers may be made by well known methods, e. g., by reacting bis-chloroalkyl ethers of the formula Cl—ROR'—Cl, where R and R' are bivalent alkylene radicals which are preferably the same, with a phenol or naphthol or a mixture of phenols and/or naphthols in the presence of an alkali metal hydroxide at elevated temperatures. Such methods of making these bis-aryloxyalkyl ethers are described in U. S. 2,003,295.

The bis-aryloxyalkyl ethers used in the practice of this invention include those derived from the substituted phenols or naphthols having substituents such as methyl, ethyl, phenyl, cyclohexyl, halogen, aryloxy or alkoxy groups, and the like. Thus, they may be derived, for example, from one or a mixture of the ortho, para, and meta cresols, ethylphenol, cyclohexylphenol, chloronaphthol, guaiacol, xylenol, ortho-chlorophenol and the like. In all cases the aryl radicals of the ethers used in the present invention have their free valence belonging directly to a carbon atom of the aromatic nucleus and not to a side chain. As alkyl ethers, beta'-bis-chloroethyl ether, gamma, gamma'-bis-chloropropyl ether, and the higher homologs may be used.

The ethers thus include bis-cresoxyethyl ether, bis-xylyloxyethyl ether, bis-ortho-chlorophenoxyethyl ether, bis-ortho-methoxyphenoxyethyl ether, bis-xylyloxybutyl ether, bis-cresoxypropyl ether as well as others made according to the disclosure of the above-mentioned patent or by similar methods.

The polymers plasticized according to the present invention include not only the self-polymers of compounds of the general formula

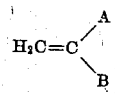

where A is hydrogen or an alkyl radical, and B is selected from the group consisting of halogen, aryl, cyano, acyl, acyloxy, alkoxy, aryloxy, carboalkoxy, and carboaryloxy radicals, but also polymers prepared from two or more such compounds as well as derivatives thereof which are substantially free of active hydrogen; for example, the polymers obtained by treating with aldehydes, such as formaldehyde or acetaldehyde, the partial hydrolysis products of polyvinyl acetate. The term "vinyl chloride polymer" as used herein refers not only to the polymers from vinyl chloride, but also to the polymers formed by polymerizing together a large proportion of vinyl chloride with a smaller proportion of vinyl acetate; of these the preferred are the vinyl chloride polymers obtained by polymerizing together 87 parts of vinyl chloride with 13 parts of vinyl acetate.

Polymers obtained from the esters of methacrylic acid, such as methyl methacrylate and the higher methacrylates and interpolymers thereof with esters of methacrylic acid with higher aliphatic alcohols are particularly preferred in the practice of this invention.

The compositions of this invention comprise a combination of a polymer of at least one compound of the general formula

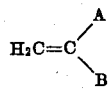

where A is hydrogen or an alkyl radical, and B is selected from the group consisting of halogen, aryl, cyano, acyl, acyloxy, alkoxy, aryloxy, carboalkoxy, and carboaryloxy radicals, with a bis-aryloxyalkyl ether. Where use as a coating composition is contemplated, a solvent is added in the desired proportion. The solvent chosen will depend chiefly upon the solubility characteristics of the polymer and the intended use, since the bis-aryloxyalkyl ethers are themselves compatible with all the usual organic solvents known to the art, e. g., ketones, alcohols, esters, ethers, hydrocarbons, and the like. It is preferred, for economic reasons, to use the cheaper solvents such as the aromatic hydrocarbons. Inclusion of a small proportion of an alcohol, ketone, or ester solvent is often desirable to yield low viscosity solutions with certain polymers.

The more detailed practice of this invention is illustrated by the following examples wherein the parts given are by weight, unless otherwise stated. There are, of course, many forms of the invention other than these specific embodiments.

Example I

| | Parts |
|---|---|
| Methyl methacrylate polymer | 150 |
| Bis-cresoxyethyl ether | 96 |
| Toluene | 522 |
| Isobutyl alcohol | 78 |

The above materials were thoroughly mixed in a closed vessel by means of an efficient agitator until a clear, homogeneous solution resulted. This composition, when applied to metal or glass by brushing, yielded a coating which, after drying in air, was tough and flexible.

Example II

| | Parts |
|---|---|
| Vinyl chloride-vinyl acetate polymer formed from 87 parts of vinyl chloride and 13 parts of vinyl acetate | 160 |
| Bis-cresoxyethyl ether | 39 |
| Toluene | 160 |
| Xylene | 80 |
| Methylisobutyl ketone | 250 |

The above materials were thoroughly mixed by tumbling in a closed vessel until a clear, homogeneous solution was obtained. When applied as a coating composition by brushing and thoroughly air-dried, the resulting coating was flexible and clear.

Example III

| | Parts |
|---|---|
| Methyl methacrylate polymer | 100 |
| Bis-phenoxyethyl ether | 50 |
| Toluene | 300 |
| Isobutyl alcohol | 50 |

A solution was prepared from the above materials by the same procedure described in Example II. When this solution was applied as a coating composition by brushing, the resulting coating after thoroughly drying at 65° C. was tough and flexible, although slightly hazy.

Example IV

| | Parts |
|---|---|
| Methyl methacrylate polymer | 100 |
| Bis-ortho-methoxyphenoxyethyl ether | 50 |
| Toluene | 300 |
| Isobutyl alcohol | 50 |

A solution was prepared from these ingredients by the same procedure described in Example II. Coatings applied by brushing of this solution were tough and flexible after drying.

Example V

| | Parts |
|---|---|
| Methyl methacrylate polymer | 100 |
| Bis-xylyloxyethyl ether | 50 |
| Toluene | 300 |
| Isobutyl alcohol | 50 |

A homogeneous solution was prepared from these materials by slowly stirring in a closed vessel. Coatings prepared from this solution by brushing became clear, tough, and well plasticized on drying.

The proportions of polymer and bis-aryloxyalkyl ether used in any one case depend somewhat upon the specific polymer used, the ether used, and the intended use of the composition. In general, it is preferred to use not less than about one part of the bis-aryloxyalkyl ether for about 10 parts of the polymer. A satisfactory degree of pliability and elasticity can usually be obtained by using no more than about 10 parts of the bis-aryloxyalkyl ether for 10 parts of the polymer. In order to obtain maximum toughness, it is preferred to use from 2.5 to not more than 7 parts of bis-aryloxyalkyl ether for 10 parts of polymer. The following table is illustrative of the variations in properties obtained by varying the proportions of polymer and of bis-aryloxyalkyl ether.

| Polymer | Plasticizer | Proportion of polymer to plasticizer | Properties of dried film (2 wks. at 65° C.) |
|---|---|---|---|
| Methyl methacrylate | None | | Very brittle. |
| Do | Bis-cresoxyethyl ether | 10:1 | Tougher than control. |
| Do | do | 4:1 | Much tougher and more flexible than control. |
| Do | do | 2:1 | Very flexible and tough; good elastic properties. |
| Do | do | 1:1 | Very elastic and flexible, somewhat soft. |
| Vinyl chloride-vinyl acetate polymer prepared from 87 parts of vinyl chloride and 13 parts of vinyl acetate. | None | | Low distensibility. |
| Do | Bis-cresoxyethyl ether | 10:1 | Somewhat more flexible than control. |
| Do | do | 4:1 | Very tough and flexible. |
| Do | do | 1:1 | Very soft. |

It has been found that ethers containing aryl groups derived from substituted phenols are more compatible with the polymers than ethers comprising aryl groups derived from phenol itself. Therefore, it is preferred to use the ethers derived from substituted phenols rather than from phenol itself. Further, for reasons of economy and because of somewhat greater compatibility, the ethers of the mononuclear substituted phenols are preferred to the ethers of the polynuclear phenols, e. g., the naphthols and substituted naphthols. Similarly, the ethers of diethylene glycol, prepared from a phenol and beta, beta'-bis-chloro-ethyl ether, are preferred to the aryloxy ethers of the higher di-alkylene glycols such as dipropylene glycol. It is particularly preferred to use bis-cresoxyethyl ether.

The composition prepared as described above may be formed or cast into sheets, ribbons, or foils by well-known methods. Fabrics may be coated or impregnated with these compositions. They may also be applied, pigmented or clear, as coating compositions over suitable substrates such as wood, metal, plaster, concrete and the like by brushing or spraying.

The following example is illustrative of a pigmented composition made according to this invention suitable for use as a coating composition.

Example VI

| | Parts |
|---|---|
| Methyl methacrylate polymer | 40 |
| Bis-cresoxyethyl ether | 27 |
| Acetone | 215 |
| Titanium oxide | 50 |
| Magnesium silicate (asbestine) | 5 |

The methyl methacrylate polymer and acetone were tumbled together in a closed vessel until a clear, homogeneous solution was obtained. The bis-cresoxyethyl ether and the pigments were then stirred into the solution and the whole ground in a pebble mill until the pigment was well dispersed to form a smooth composition free from lumps.

A particularly important use of these compositions is as protective coatings over alkaline structural surfaces such as concrete, plaster, or asbestos-cement board. They may be used in themselves, particularly when pigmented, as a complete finish of excellent appearance and durability over such surfaces, but it is preferred to utilize them as protective primers under subsequently applied orthodox coatings of the oleoresinous type. The following examples are given to illustrate the use of these compositions as primers over alkaline structural material.

Example VII

Ten parts of Portland cement, 30 parts of sand, and one part of slaked lime were mixed with water to yield a concrete mix of normal consistency. The mix was molded into structural units consisting of blocks 12"x12"x1". After drying seven days, the blocks were finished on one face as follows:

A primer coat of a composition prepared as in Example I was brushed on, about 13.5 g. of the composition being applied, to form a uniform coating on each block. After drying 48 hours, two coats of an orthodox mixed-pigment resinous paint were applied with a 72-hour interval for drying after application of the first oleoresinous paint coat.

Example VIII

Concrete blocks molded as in Example VII were primed with one coat of a resin composition prepared as described in Example I. The coating was allowed to dry 48 hours, thereafter two coats of an oil-modified alkyd-resin paint, pigmented with a barium sulfate extended titanium pigment, were applied, allowing 72 hours for drying after the first oleoresinous coat.

Example IX

Concrete blocks molded as in Example VII were primed with one coat of a resin composition prepared as described in Example II. Thereafter two coats of an oil-modified alkyd-resin paint, pigmented with a barium sulfate extended titanium pigment, were applied.

Structural units prepared as described in Examples VII and VIII were in good condition after 8 months' outdoor exposure, facing south at an angle of 45°, whereas panels prepared and exposed in the same way, except that no protective primer film was applied, were badly chipped, cracked, and flaked. In one case a panel prepared according to Example VII was exposed outdoors faced up over a bed of sand, which was water-saturated during each rain storm, together with a panel prepared in the same way except that no protective primer film was used. The paint film was completely removed from the latter by cracking, flaking, and peeling within one month whereas the former having the protective primer film was in excellent condition after 15 months.

Structural units prepared as in Examples VII, VIII and IX have also been tested indoors with the unpainted back of each panel immersed in water. Under such conditions, panels prepared in the same way as the test panels, except that no protective primer films were used, became stained and yellowed after several weeks' exposure. The paint film became tacky and was entirely removed by gentle rubbing with a damp cloth. On the other hand, test panels prepared as described in the above-mentioned examples and having the protective primer film applied under the oleoresinous top coat remained in excellent condition after much longer periods of exposure, e. g., up to eight weeks. The paint surface remained unstained and white and the film remained hard and completely resistant to removal by rubbing with a damp cloth.

The experiments described above show that the polymer compositions of this invention not only are themselves stable toward the action of alkali, thus maintaining good adhesion and freedom from flaking and peeling, but also are impermeable to the passage of water-soluble alkaline materials, and thus prevent these materials formed or existing in the substrate from coming in contact with and degrading the oleoresinous top coats. Thus, tackiness, cracking, and discoloration of the top coat are prevented. Furthermore, these experiments show that oleoresinous topcoats adhere particularly well to the plasticized polymer compositions of the present invention so that separation of coats does not occur.

The increased durability contributed by these compositions, as described above, is particularly surprising because of the small amount of the compositic required as primer to give the protective effect. From Example VII it may be calculated that the primer film has an average thickness of less than 0.002". The fact that the protective effect is exerted by a thin film of the composition is of great technical importance.

Where pigmented polymer compositions of the present invention are used over alkaline surfaces as complete coating compositions or as primers under oleoresinous topcoats, the use of alkali-sensitive pigments, such as Prussian blue or chrome green should be avoided. All the common pigments or extenders which are stable toward alkali, including titanium oxide, zinc oxide, basic lead carbonate, barium sulfate, magnesium silicate, iron oxide, and the like may be used successfully. The avoidance of alkali-sensitive pigments is advisable to preclude the possibility of fading, discoloration and chalking of the pigment due to alkali. Where the pigmented composition is used as a protective primer under an oleoresinous top coat, it is particularly important that only alkali-staple pigments be used, since alkali-sensitive pigments may form a point of weakness for the transmission of alkali through the otherwise alkali-impermeable film and may thus allow alkali to attack the oleoresinous top coat.

The compositions described in the present invention maybe utilized cheaply, since they are compatible with inexpensive hydrocarbon solvents. They are permanently flexible, a property of extreme importance in the field of coating compositions and also retain their flexibility at low temperatures. As shown in the experiments described above, these compositions contribute in a very surprising degree to the durability of finishing systems, particularly over alkaline structural surfaces. It is well known in the finishing art that calcareous structural surfaces, particularly concrete, are hard to finish successfully because oleoresinous paints which show outdoor stability over metal or wood are not durable over calcareous surfaces, and particularly over freshly prepared surfaces, e. g., freshly plastered walls or new concrete structures. This is believed to be due to degradation of the oleoresinous vehicle by lime or particularly by alkalis formed in the substrate. The paint film soon exhibits severe staining and discoloration or may fail by severe cracking, flaking, or peeling, or may actually become tacky and water-sensitive, depending upon the nature of the atmospheric conditions encountered and also upon the specific surface. Thus, present paints are particularly liable to discoloration when applied to a concrete wall which is exposed at the back to moisture, or to a humid atmosphere. Consequently, calcareous surfaces have customarily been allowed to age for an extended period before painting. This procedure involves an inconvenience and loss. Further delay in painting merely lessens the degree of failure without overcoming it. These difficulties may now be overcome by the use of the compositions of the present invention. Application of a primer film of such a composition under an orthodox oleoresinous paint film prevents completely the severe failure heretofore encountered in the painting of concrete surfaces.

The above description and examples are intended to be illustrative only. Any modification of or variations therefrom which conforms to the spirit of the invention is intended to be included within the scope of the claims.

I claim:
1. An article having an alkaline calcareous surface, said surface being coated with a composition impermeable to the passage of water soluble alkaline materials and thereby protective of a further coating of alkali sensitive oleoresinous compositions, said impermeable coating comprising a polymer, substantially free from active hydrogen, of at least one compound of the general formula

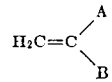

where A is selected from the class consisting of hydrogen and alkyl and B is selected from the group consisting of halogen, aryl, cyano, acyl, acyloxy, alkoxy, aryloxy, carboalkoxy, and carboaryloxy radicals, plasticized with a bis-aryloxyalkyl ether and thereover a coating of an alkali sensitive oleoresinous composition.

2. Process which comprises applying to an alkaline calcareous surface a liquid coating composition impermeable to the passage of water soluble alkaline materials and thereby protective of a further coating of alkali sensitive oleoresinous compositions, said impermeable coating essentially comprising a polymer substantially free from active hydrogen of at least one compound of the general formula

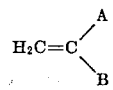

where A is selected from the class consisting of hydrogen and alkyl and B is selected from the group consisting of halogen, aryl, cyano, acyl, acyloxy, alkoxy, aryloxy, carboalkoxy, and carboaryloxy radicals, and as a plasticizer therefor, a bis-aryloxyalkyl ether, drying the coating and applying thereover a coating of an alkali sensitive olerasinous composition.

3. An article having an alkaline calcareous surface, said surface being coated with a composition impermeable to the passage of water soluble alkaline materials and thereby protective of a further coating of alkali sensitive oleoresinous compositions, said impermeable coating comprising a methyl methacrylate polymer and as a plasticizer therefor a bis-aryloyalkyl ether and thereover a coating of an oleoresinous composition.

4. An article having an alkaline calcareous surface, said surface being coated with a composition impermeable to the passage of water soluble alkaline materials and thereby protective of a further coating of alkali sensitive oleoresinous compositions, said impermeable coating comprising a polymer of vinyl chloride and as a plasticizer therefor a bis-aryloxyalkyl ether and thereover a coating of an alkali sensitive oleoresinous composition.

5. An article having an alkaline calcareous surface said surface being coated with a composition impermeable to the passage of water soluble alkaline materials and thereby protective of a further coating of alkali sensitive oleoresinous composition, said impermeable coating comprising polymethyl methacrylate plasticized with bis cresoxyethyl ether and thereover a coating of an alkali sensitive oleo-resinous composition.

6. An article having an alkaline calcareous surface said surface being coated with a composition impermeable to the passage of water soluble alkaline materials and thereby protective of a further coating of alkali sensitive oleo-resinous compositions, said impermeable coating comprising a polymer, substantially free from active hydrogen, of at least one compound of the general formula

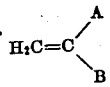

where A is selected from the class consisting of hydrogen and alkyl and B is selected from the class consisting of halogen, aryl, cyano, acyl, acyloxy, alkoxy, aryloxy, carboalkoxy, and carboaryloxy radicals and bis-cresoxyethyl ether as a plasticizer for said polymer and thereover a coating of an alkali sensitive oleoresinous composition.

7. An article having an alkaline calcareous surface said surface being coated with a composition impermeable to the passage of water soluble alkaline materials and thereby protective of a further coating of alkali sensitive oleoresinous compositions, said impermeable coating comprising a polymer of vinyl chloride and as a plasticizer therefor bis-cresoxyethel ether and thereover a coating of an alkali sensitive oleoresinous composition.

RICHARD STANLEY SHUTT.

CERTIFICATE OF CORRECTION.

Patent No. 2,286,767. June 16, 1942.

RICHARD STANLEY SHUTT.

It is hereby certified that error appears in the printed specification of the above numbered patent requiring correction as follows: Page 2, second column, line 7, for "amove" read --above--; page 4, second column, line 47, before "oleoresinous" insert --alkali sensitive--; and that the said Letters Patent should be read with this correction therein that the same may conform to the record of the case in the Patent Office.

Signed and sealed this 4th day of August, A. D. 1942.

(Seal)

Henry Van Arsdale,
Acting Commissioner of Patents.